J. McCASKEY.
AUTOMOBILE LIGHT.
APPLICATION FILED MAR. 12, 1917.

1,259,252.

Patented Mar. 12, 1918.

Inventor
Joseph McCaskey
By R. J. Elliott
Attorney

UNITED STATES PATENT OFFICE.

JOSEPH McCASKEY, OF WILKESON, WASHINGTON.

AUTOMOBILE-LIGHT.

1,259,252.   Specification of Letters Patent.   Patented Mar. 12, 1918.

Application filed March 12, 1917. Serial No. 154,092.

*To all whom it may concern:*

Be it known that I, JOSEPH MCCASKEY, a citizen of the United States, residing at Wilkeson, in the county of Pierce, State of Washington, have invented certain new and useful Improvements in Automobile-Lights, of which the following is a specification.

This invention relates to devices for illuminating the roadway in front of an automobile and has special reference to such illumination to be used when passing another automobile or other vehicles. The object of the invention is to provide a means whereby a strong headlight may be normally used to project its beams a considerable distance ahead of the car and whereby, when another car is approaching, the beams of said light are projected downward to shine on the ground in front of the car and to avoid interfering with the clear vision of the driver of said other car, and whereby an additional spot-light is automatically lighted, said additional light shining on the ground on the passing side of the car. A further object is to provide efficient illumination of the road in front of the car especially during a fog or in passing over very rough ground, or in passing through cities.

I attain these and other objects by the devices, mechanisms, and arrangements illustrated in the accompanying drawings, in which—

Similar numerals of reference refer to similar parts throughout the severals views.

Figure 1:
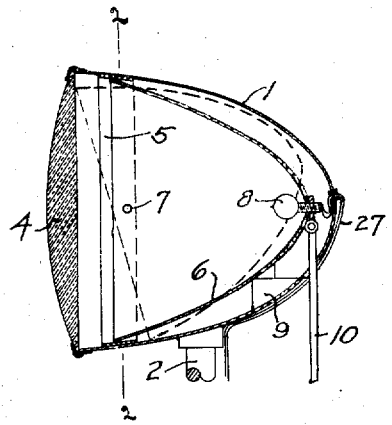
Figure 1 is a vertical section of my improved headlight.
Figure 2:
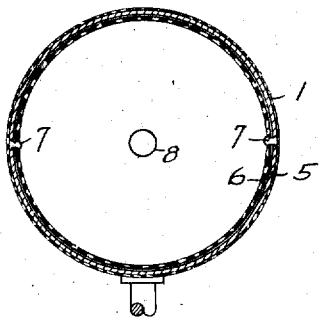
Fig. 2 is a cross-section thereof on the line 2—2 in Fig. 1.
Figure 3:
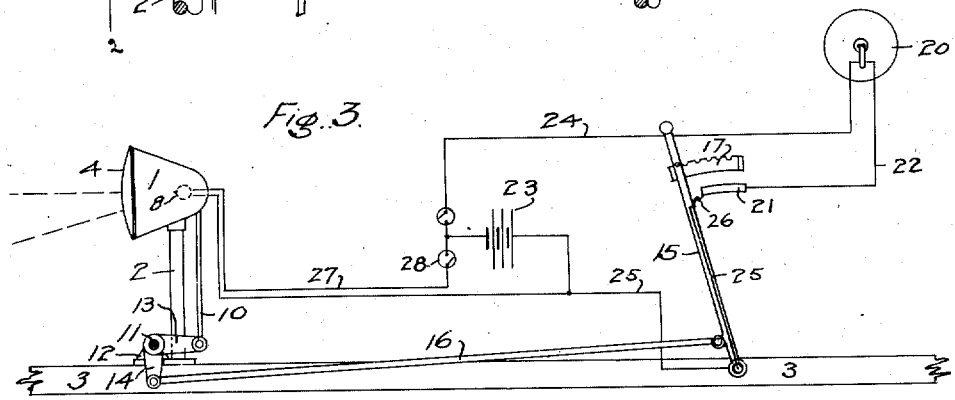
Fig. 3 is a diagrammatic view illustrating my invention.
Figure 4:
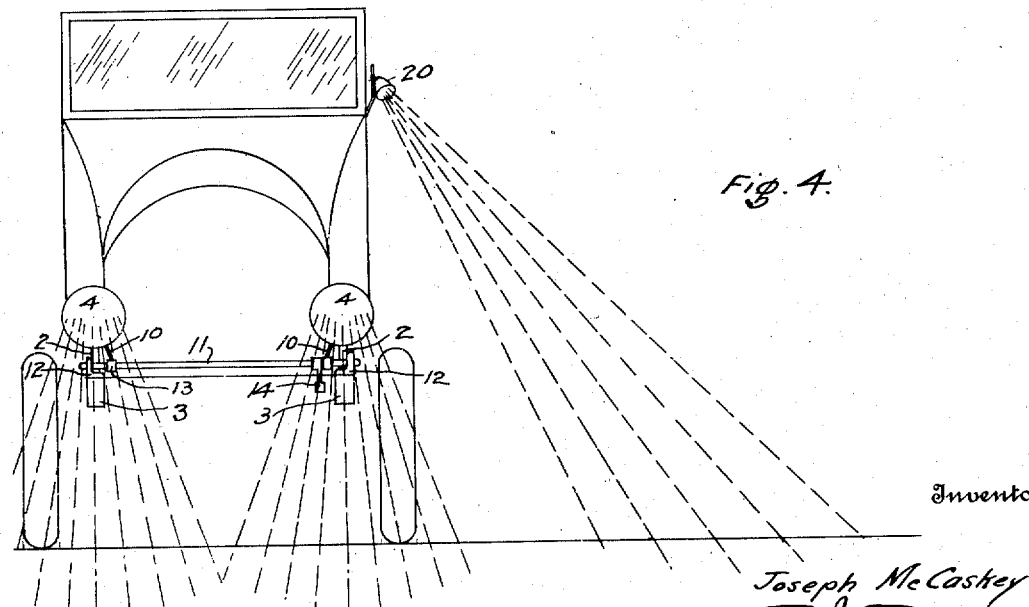
Fig. 4 is a front view of an automobile equipped with my invention.

The two headlights are of the kind known as spot-lights and are adapted to send strong beams of lights a great distance. Each headlight consists of an outer body or shell 1 suitably secured on a standard 2 mounted on the frame 3 of the car, the front of said shell being closed by a glass 4 which may be either plane or some form of lens, as desired. A carrier ring 5 is removably secured within the shell 1 and the front portion of the reflector body 6 is pivotally secured to said ring 5 by means of horizontal pivot pins, or rivets, 7. An electric lamp 8 is carried by the reflector body 6 and moves with it. The rear end of the reflector rests normally on a lug 9 in the shell 1, and has a rod 10 pivotally secured to it whereby it may be raised to direct the beams from the reflector downward. The rod 10 is operated by the following mechanism:

A horizontal transverse shaft 11 extends across the front of the frame 3 of the machine, being mounted in suitable bearing lugs 12. A pair of lever arms 13 are secured to the shaft 11, one such arm being adjacent each headlight. The rods 10 join the ends of the arms 13 with the rear ends of the reflectors 6. An operating lever 14 is also secured to said shaft 11 at a suitable point thereon. A hand lever 15 is pivoted to the frame 3 of the car at a convenient place therein and a rod 16 connects said lever 15 to the shaft lever 14, whereby when said hand lever 15 is moved the two reflectors 6 are turned on the pivots 7 so as to send their beams either substantially horizontally or at an angle downward in front of the car, according to the position and motion of said hand lever 15. The hand lever 15 preferably engages a ratchet plate 17 which may be provided with a series of notches adapted to receive a suitable spring dog on the lever 15 whereby said lever may be held in any position in the usual way. The plate 17 may also be preferably turned out at its ends to limit the motion of the lever 15 and therefore of the lamp reflectors 6.

A side spot-light 20 is also mounted on the passing side of the car, in such position as to throw its beam on the ground near the car. This light is normally dark. When, however, the hand lever 15 is moved to turn the light of the headlights downward, it closes the electric circuit by which said spot-light 20 is lighted, as follows:—A contact plate 21 is suitably supported on the car adjacent to the lever 15; said plate 21 being electrically connected to the lamp in the spot-light 20, by means of the wire 22. One terminal of the battery 23, or other source of electric energy, is connected to the other terminal of the lamp of the light 20 by the wire 24. The other terminal of the battery 23 is connected to the pivot of the lever 15, by the wire 25 which also passes up the said lever to the contact brush 26 which is mounted on the lever 15 in such position as to engage the contact plate 21. The brush 26 does not contact with the plate 21 when the lever 15 is in such position that the headlights are projecting their beams horizontally, but as soon as it is moved from said position to project the headlights downward, the circuit is completed through the brush 26 and the plate 21 and the light 20 is illuminated. The plate 21 and the brush 26 therefore constitute a switch. The battery 23, or other source of electric energy, is connected by the wire 27 to the lamps in the headlights; a suitable switch 28 being placed in said circuit.

It is evident, then, that normally the reflectors of the headlights project their beams substantially horizontally, but that they may be projected downward by simply moving the lever 15; and that when they are in said normal position, the side spot-light 20 is dark, but as soon as they are moved from said normal position, the side spot-light 20 is illumined to throw its light on the road on the passing side of the car. Also in foggy weather, the illumination of the ground in front of the car is a much more effective means of seeing the road than by projecting the beams horizontally and simply illuminating the fog; in this case the lights are kept pointed downward.

Having described my invention, what I claim is:

1. A main light adapted to be deflected, a supplemental light included in an electric circuit, and means for deflecting the main light and simultaneously closing the circuit of the supplemental light.

2. In an automobile light, the combination with the vehicle frame; of a source of electric energy; a headlight mounted on said frame and electrically connected to said source whereby it is illuminated; manually operable means whereby a portion of said headlight may be swung to project its beams substantially horizontally or at an angle downward, a fixed side light projecting its beams downward and electrically connected to said source of electric energy, said side light being mounted on the frame; and a switch within the last circuit and connected to and operated by said manually operable means and adapted to open said circuit when the beams of the headlight shine horizontally but to close said circuit to illuminate said side light when the beams of the headlight shine downward.

3. In combination, head lights mounted to be deflected, means connecting the head lights for simultaneous movement, a supplemental light included in an electric circuit, a switch in said circuit, and manually operable means for deflecting the head lights and simultaneously closing the switch to bring the supplemental light into action.

JOSEPH McCASKEY.

Copies of this patent may be obtained for five cents each, by addressing the "Commissioner of Patents, Washington, D. C."